US012669048B1

(12) United States Patent　　(10) Patent No.:　　US 12,669,048 B1

Fouillou　　(45) Date of Patent:　　Jun. 30, 2026

(54) SYSTEMS AND METHODS FOR DOWNHOLE MEASUREMENTS

(71) Applicant: Schlumberger Technology Corporation, Sugar Land, TX (US)

(72) Inventor: Didier Fouillou, Saint Martin en Biere (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/298,507

(22) Filed: Aug. 13, 2025

(30) Foreign Application Priority Data

Jul. 3, 2025　(EP) .................................... 25306042

(51) Int. Cl.
　*E21B 47/017*　(2012.01)
　*E21B 17/10*　(2006.01)
　*E21B 49/00*　(2006.01)
　*G01V 5/12*　(2006.01)

(52) U.S. Cl.
　CPC ........ *E21B 47/017* (2020.05); *E21B 17/1078* (2013.01); *E21B 49/00* (2013.01); *G01V 5/125* (2013.01)

(58) Field of Classification Search
　CPC ........................... E21B 17/1078; E21B 47/017
　See application file for complete search history.

(56) References Cited

U.S. PATENT DOCUMENTS

| | | | | |
|---|---|---|---|---|
| 4,664,206 A | * | 5/1987 | Butler ................. | E21B 17/1078 |
| | | | | 175/325.2 |
| 5,363,931 A | * | 11/1994 | Moriarty ............. | E21B 17/1078 |
| | | | | 175/325.5 |
| 5,397,893 A | * | 3/1995 | Minette ................... | E21B 47/00 |
| | | | | 250/262 |
| 10,502,008 B2 | | 12/2019 | Perrin | |
| 2004/0251048 A1 | * | 12/2004 | Kurkoski ................ | E21B 47/01 |
| | | | | 175/41 |
| 2006/0070731 A1 | * | 4/2006 | Fouillou ................. | E21B 47/01 |
| | | | | 166/241.6 |
| 2008/0047754 A1 | * | 2/2008 | Evans ................. | E21B 17/1078 |
| | | | | 175/325.5 |
| 2015/0144401 A1 | * | 5/2015 | Nagaraj .............. | E21B 17/1078 |
| | | | | 175/320 |
| 2016/0032708 A1 | * | 2/2016 | Mahjoub ............... | E21B 47/017 |
| | | | | 166/241.6 |
| 2017/0268299 A1 | * | 9/2017 | Perrin ................. | E21B 17/1078 |

* cited by examiner

*Primary Examiner* — David Carroll

(74) *Attorney, Agent, or Firm* — Kyle R. Miiller

(57)　　　　　ABSTRACT

A tool may include a body having a rotational axis oriented in an axial direction. A tool may include a sensor positioned proximate to a window in a radially outward surface of the body, wherein the window defines a window outer diameter relative to the rotational axis. A tool may include a plurality of stabilizer pads positioned on the outward surface of the body in a downhole direction of the axial direction relative to the window, wherein the plurality of stabilizer pads defines a pad outer diameter relative to the rotational axis that is greater than the window outer diameter.

18 Claims, 7 Drawing Sheets

100

103

101

107

104

105

109

108

102

106

110

SYSTEMS AND METHODS FOR DOWNHOLE MEASUREMENTS

CROSS-REFERENCE TO RELATED APPLICATIONS

This application claims priority to and benefit of EP patent application Ser. No. 25/306,042.0, filed Jul. 3, 2025, which is incorporated by reference herein in its entirety.

BACKGROUND

Measurements of downhole environments and properties of the surrounding formation can be made during drilling or other formation of a borehole. The detectors, energy sources, sensors, and other componentry for measuring downhole properties can be sensitive components or otherwise less robust than other downhole components, such as the drill bit, steering components, and drill pipe. The detectors, energy sources, sensors, and other componentry for measuring downhole properties can, therefore, experience wear more easily and/or more rapidly than other components when insufficiently protected during drilling operations.

SUMMARY

In some aspects, the techniques described herein relate to a downhole tool including: a body having a rotational axis oriented in an axial direction; a sensor positioned proximate to a window in a radially outward surface of the body, wherein the window defines a window outer diameter relative to the rotational axis; and a plurality of stabilizer pads positioned on the outward surface of the body in a downhole direction of the axial direction relative to the window, wherein the plurality of stabilizer pads defines a pad outer diameter relative to the rotational axis that is greater than the window outer diameter.

In some aspects, the techniques described herein relate to a system for drilling a borehole, the system including: a drill bit having a rotational axis and a bit diameter relative to the rotational axis; and a logging-while-drilling (LWD) tool connected to the drill bit, the LWD tool including: a body having a rotational axis oriented in an axial direction, a sensor positioned proximate to a window in a radially outward surface of the body, wherein the window defines a window outer diameter relative to the rotational axis, and a plurality of stabilizer pads positioned on the outward surface of the body in a downhole direction of the axial direction relative to the window, wherein the plurality of stabilizer pads defines a pad outer diameter relative to the rotational axis that is less than the bit diameter and greater than the window outer diameter.

In some aspects, the techniques described herein relate to a system for drilling a borehole, the system including: a drill bit having a rotational axis and a drill bit diameter relative to the rotational axis; a rotary steerable system (RSS) connected to the drill bit, and a logging-while-drilling (LWD) tool connected to the drill bit, the LWD tool including: a body having a rotational axis oriented in an axial direction; a sensor positioned proximate to a window in a radially outward surface of the body, wherein the window defines a window outer diameter relative to the rotational axis; and a plurality of stabilizer pads positioned on the outward surface of the body, wherein the plurality of stabilizer pads defines a pad outer diameter relative to the rotational axis that is greater than the window outer diameter.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which.

DETAILED DESCRIPTION

Embodiments of the present disclosure generally relate to devices, systems, and methods for drilling a borehole. More particularly, embodiments of the present disclosure relate to systems and methods for measuring downhole properties during drilling operations. For example, the bottomhole assembly (BHA) and/or drill string in the downhole environment may include one or more detectors or sensors configured to measure one or more properties of the surrounding formation through which the drill bit and drill string form the borehole.

In some embodiments, a drill string includes one or more measurement devices configured to collect signals or make measurements of downhole properties in a downhole environment. In some embodiments, the measurement devices collect information regarding the drill string, itself. In some embodiments, the measurement device collects information regarding the surrounding formation. The measurements of the surrounding formation may measure one or more properties of the solid material in the formation, such as rock, sediment, or organic material. The measurements of the surrounding formation may measure the formation fluid(s) in the formation. The measurements may include exposing the surrounding formation to an energy source, such as a radiation source, and measuring a response from the surrounding formation.

In at least one example, the measurement tool includes a gamma-radiation source that irradiates a portion of the surrounding formation. The gamma-radiation energizes material in the portion of the surrounding formation, which subsequently emits a signal. The measurement tool includes a detector that receives the signal and interprets the signal to determine a composition of at least part of the surrounding formation. In some embodiments, noise produced by drilling mud, swarf, cuttings, the tool body, and other material between the source and the formation and between the formation and the detector can interfere with measurements. Polymer or other radio-transparent windows can improve signal to noise ratio, but may experience accelerated wear.

Figure 1:
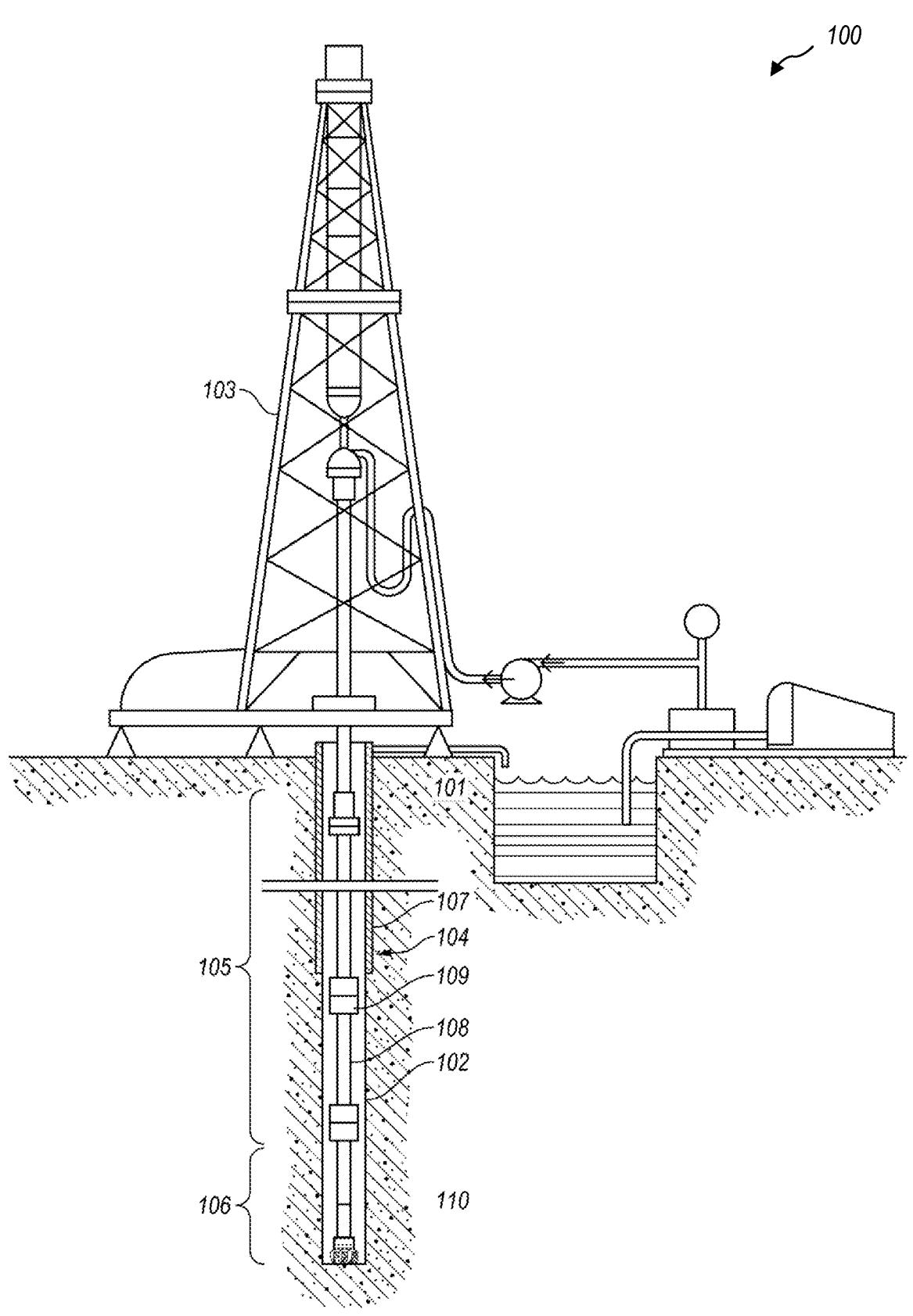
FIG. 1 illustrates a drilling system and downhole environment, according to at least some embodiments of the present disclosure.

FIG. 1 illustrates an embodiment of a drilling system and downhole environment. FIG. 1 shows one example of a drilling system 100 for drilling an earth formation 101 to form a borehole 102. The drilling system 100 includes a drill rig 103 used to turn a drilling assembly 104 which extends downward into the borehole 102. The drilling assembly 104 may include a drill string 105 and a bottomhole assembly (BHA) 106 attached to the downhole end of the drill string 105. Where the drilling system 100 is used for drilling formation, a drill bit 110 can be included at the downhole end of the BHA 106.

The drill string 105 may include several joints of drill pipe 108 connected end-to-end through tool joints 109. The drill string 105 transmits drilling fluid through a central bore and can transmit rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, for lifting cuttings out of the borehole 102 as it is being drilled, and for preventing the collapse of the borehole 102. The drilling fluid carries drill solids including drill fines, drill cuttings, and other swarf from the borehole 102 to the surface based on a hydrostatic pressure of the borehole 102. The drill solids can include components from the earth formation 101, the drilling assembly 104 itself, from other man-made components (e.g., plugs, lost tools/components, etc.), or combinations thereof.

The BHA 106 may include the bit 110 or other components. An example BHA 106 may include additional or other components (e.g., coupled between to the drill string 105 and/or the bit 110). Examples of additional BHA components include drill collars, stabilizers, measurement-while-drilling (MWD) tools, logging-while-drilling (LWD) tools, downhole motors, underreamers, directional steering tools, section mills, hydraulic disconnects, jars, vibration damping tools, other components, or combinations of the foregoing. In some embodiments, (as will be described in more detail herein) the MWD tools and/or LWD tools include one or more sensors, sensor windows, radio-transparent windows, radio-translucent windows, or other comparatively sensitive components that enable downhole measurements, but are more vulnerable to damage or wear than other components of the drilling system 100.

In general, the drilling system 100 may include other drilling components and accessories, such as special valves (e.g., kelly cocks, blowout preventers, safety valves, centrifuges, shaker tables, and rheometers). Additional components included in the drilling system 100 may be considered a part of the surface system (e.g., drill rig 103, drilling assembly 104, drill string 105, or a part of the BHA 106, depending on their locations and/or use in the drilling system 100).

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits, roller cone bits, impregnated bits, or coring bits. In other embodiments, the bit 110 may be a mill used for removing metal, composite, elastomer, other materials downhole, or combinations thereof. For instance, the bit 110 may be used with a whipstock to mill into casing 107 lining the borehole 102. The bit 110 may also be a junk mill used to mill away tools, plugs, cement, other materials within the borehole 102, or combinations thereof. Swarf or other cuttings formed by use of a mill may be lifted to surface by the drilling fluid or may be allowed to fall downhole. The conditions of the equipment of the drilling system 100, the formation 101, the borehole 102, the drilling fluid, or other part of the wellsite can change during operations.

In some embodiments, the BHA 106 includes a plurality of components that are exposed to mechanical shock and vibration, elevated temperatures, abrasion from the formation 101 and/or cuttings and swarf, and other potentially damaging effects of the downhole environment.

Figure 2:
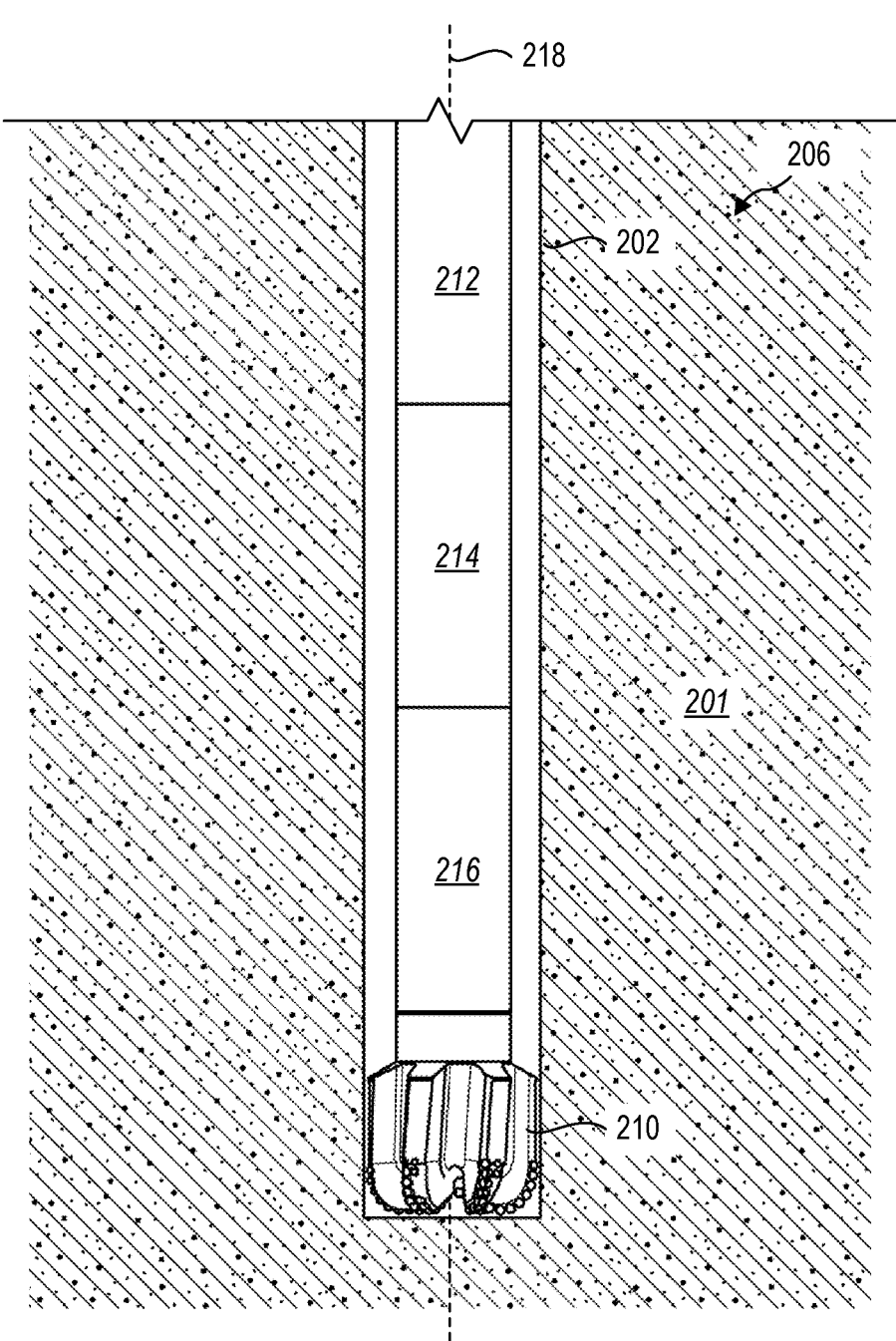
FIG. 2 is a schematic representation of a BHA in a borehole through a formation, according to at least some embodiments of the present disclosure.

FIG. 2 is a schematic representation of an embodiment of a BHA 206 in a borehole 202 through a formation 201. In some embodiments, the BHA 206 includes a drill bit 210 configured to remove and/or degrade material from the formation 201 to remove the material uphole through the borehole 202. The BHA 206, in some embodiments, includes one or more additional downhole tools based on the drilling plan. For example, a BHA 206 may include an LWD tool 212 connected to one or more components of the BHA 206 and located uphole of the drill bit 210. In some examples, the BHA 206 may include a MWD tool 214 connected to one or more components of the BHA 206 and located uphole of the drill bit 210. The BHA 206 may include a rotary steerable system (RSS) 216 connected to one or more components of the BHA 206 and located uphole of the drill bit 210. While the BHA 206 described in relation to FIG. 2 includes the LWD tool 212, MWD tool 214, and RSS 216 in series, in some embodiments, additional components or tools are present in the BHA 206, and the BHA 206 may extend tens of feet or meters uphole from the drill bit 210.

As described herein, the LWD tool 212 is positioned in an uphole direction from the drill bit 210 and, in some embodiments, in a BHA 206 with an RSS 216. In such examples, the LWD tool 212 is exposed to drilling mud flowing in the annular space around the LWD tool 212 and BHA 206, which includes swarf, cuttings, and other debris created by the drill bit 210. The drilling mud can damage a sensor or window of the LWD tool 212 and/or interfere with measurements or signals collected by the sensors or detectors of the LWD tool 212. Furthermore, the RSS 216 may be configured to apply a lateral force to the formation 201 at the wall of the borehole 202 and urge the drill bit 210 and BHA 206 in the opposite direction. This can cause contact between a sensor or window of the LWD tool 212 and the formation 201, damaging the sensor or window of the LWD tool 212. The varying distance from the sensor or window of the LWD tool 212 to the formation 201 (and the varying volume of drilling mud therebetween) can limit the precision and/or accuracy of formation measurements.

Figure 3:
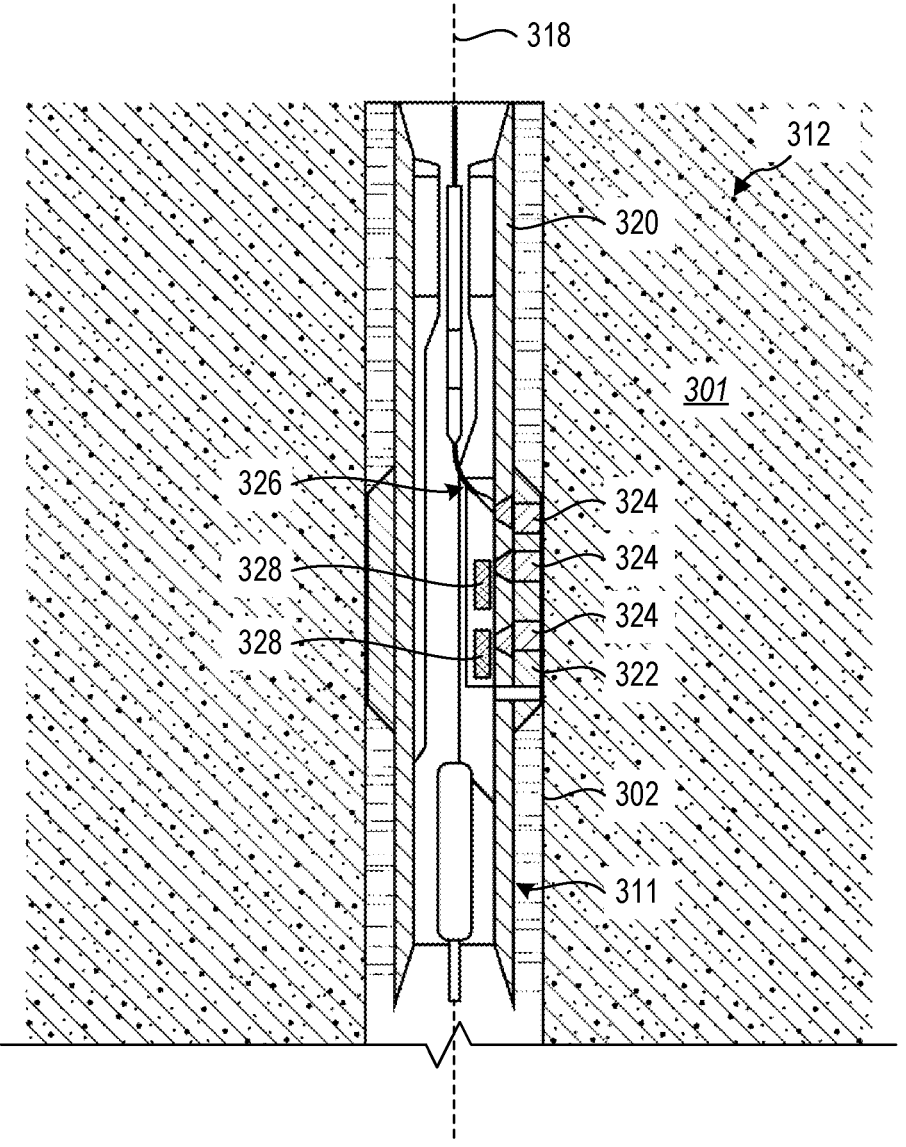
FIG. 3 is a side cross-sectional view of an LWD tool configured to emit and receive radiation to measure at least one property of the formation, according to at least some embodiments of the present disclosure.

FIG. 3 is a side cross-sectional view of an embodiment of an LWD tool 312 configured to emit and receive radiation to measure at least one property of the formation 301. In some embodiments, the LWD tool 312 includes a body 320 having a rotational axis 318 about which the LWD tool 312 rotates during drilling operations. In some embodiments, the body 320 is made or includes elements or compounds that can limit or prevent the emission of radiation from the radiation source 326 and/or limit or prevent the receipt of radiation at a radiation detector 328. In some examples, the body 320 is a steel or other iron-bearing alloy. In some examples, the iron can absorb and/or re-emit photons that interfere with the measurements of the formation 301.

The LWD tool 312, in some embodiments, includes a radio-transparent or radio-translucent window 324. For example, the window 324 may be or include a polymer material. The windows 324 allow the photons and/or radiation produced by the radiation source 326 to exit the LWD tool 312 more efficiently than exiting through the body 320 of the LWD tool 312. The energizing radiation may subsequently energize and/or interact with the formation 301, and the window(s) 324 allow the signal radiation from the formation 301 to enter into the LWD tool 312 for detection by the radiation detector(s) 328. In some embodiments, the energizing radiation from the radiation source 326 and/or the signal radiation is inhibited by a drilling fluid 311 in the borehole 302 between the LWD tool 312 and the formation 301.

In some embodiments, the body 320 of the LWD tool 312 has a radially outward surface relative to the rotational axis 318 that includes a mud excluder portion 322. The mud excluder portion 322 is a region of the body 320 that has a greater outer diameter relative to the rotational axis 318 and includes the windows 324. The mud excluder portion 322 displaces the drilling fluid 311 within the annular space around the LWD tool 312 at the windows 324, reducing the amount of drilling fluid 311 between the radiation source 326 and/or the radiation detector 328 and the formation 301, which, in turn, reduces the interference caused by the drilling fluid 311.

Figure 4:
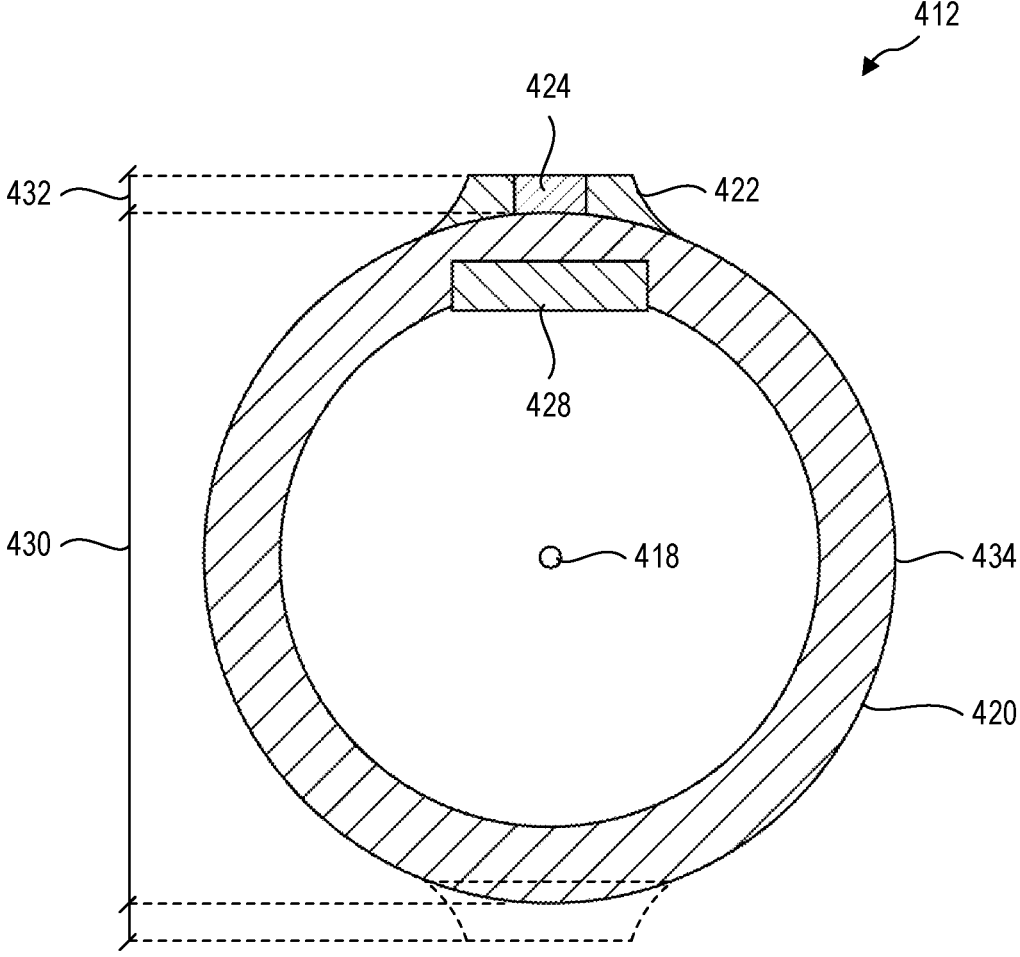
FIG. 4 is a transverse cross-sectional view of an LWD tool with a mud excluder portion protruding from the radially outward surface of the body, according to at least some embodiments of the present disclosure.

FIG. 4 is a transverse cross-sectional view of an embodiment of an LWD tool 412 with a mud excluder portion 422 protruding from the radially outward surface 434 of the body 420. In some embodiments, the mud excluder portion 422 includes a window 424 with a radiation detector 428 positioned behind (e.g., radially inward from) the window 424. In some embodiments, the mud excluder portion 422 containing the window(s) 424 defines a window outer diameter 432 that is greater than the body outer diameter 430. While the mud excluder portion 422, therefore, reduces the amount of drilling fluid between the window 424 and the formation, the mud excluder portion 422 can contact the formation. Contact between the formation and the mud excluder portion 422 can damage the mud excluder portion 422 and/or the window(s) 424. Contact between the formation and the mud excluder portion 422 during rotation of the LWD tool 412 around the rotational axis 418 can induce lateral movement of the LWD tool 412 and/or connected downhole components. The lateral movement can produce variability in the distance between the detector 428 and/or window 424 relative to the formation, compromising measurement quality, and also introduce shock and/or vibration to the LWD tool 412 and connected components.

Figure 5:
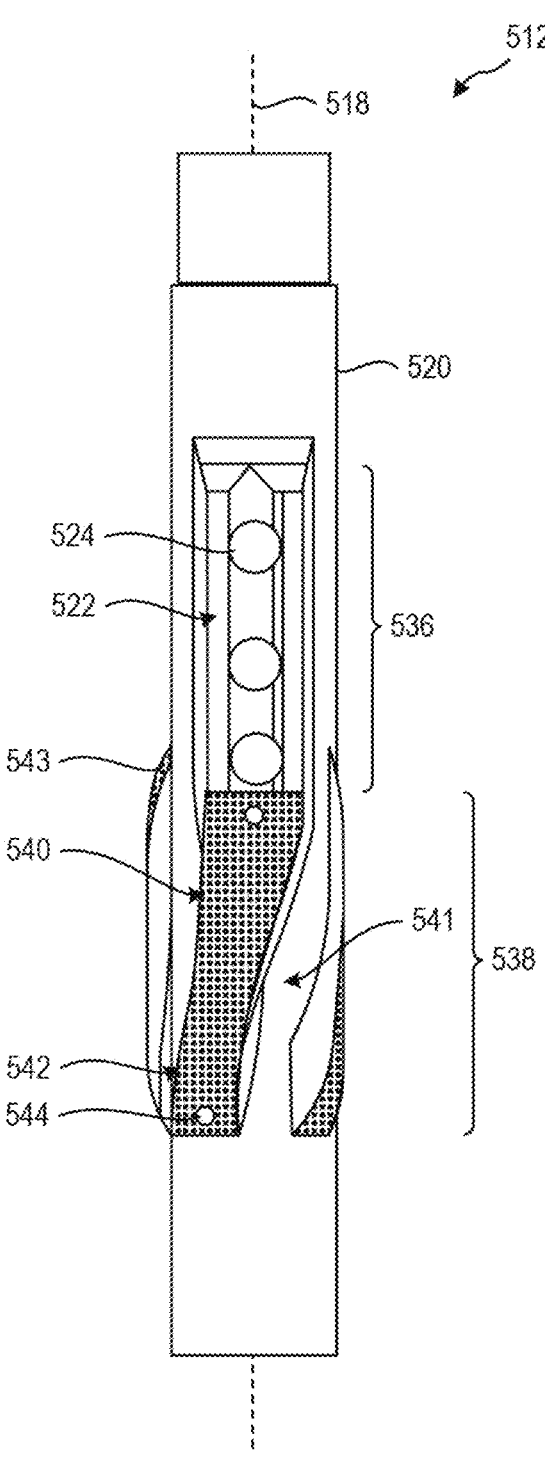
FIG. 5 is a side view of an LWD tool including at least one stabilizer pad to protect the window(s) of the LWD tool, according to at least some embodiments of the present disclosure.

FIG. 5 is a side view of an LWD tool 512 including at least one stabilizer pad 540 to protect the window(s) 524 of the LWD tool 512. In some embodiments, the stabilizer pad 540 is one of a plurality of stabilizer pads 538 that are positioned on the outer surface of the body 520 of the LWD tool 512. In some embodiments, the plurality of stabilizer pads 538 define a pad outer diameter of the LWD tool 512 that is greater than the window outer diameter of the window 524 and/or mud excluder portion 522 to provide a standoff from the formation in the borehole and protect the window 524.

In some embodiments, the plurality of stabilizer pads 538 is positioned on the body 520 in a downhole axial direction (of the rotational axis 518) relative to the windows 524 and/or mud excluder portion 522 of the body 520. In some embodiments, the windows 524 and associated radiation detectors and/or radiation sources, such as described in relation to FIGS. 3 and 4, are located in a detector region 536 of the LWD tool 512. In some embodiments, the plurality of stabilizer pads 538 is positioned on the body 520 in a downhole axial direction relative to the detector region 536.

In some embodiments, the plurality of stabilizer pads 538 is positioned on the body 520 in an uphole axial direction of the windows 524 and/or mud excluder portion 522 of the body 520. In some embodiments, the plurality of stabilizer pads 538 is positioned on the body 520 in an uphole axial direction of the detector region 536.

In some embodiments, a first plurality of stabilizer pads 538 is positioned on the body 520 in a downhole axial direction relative to the detector region 536, and a second plurality of stabilizer pads is positioned on the body 520 in an uphole axial direction relative to the detector region 536. In some embodiments, a first plurality of stabilizer pads 538 is positioned on the body 520 in a downhole axial direction of the windows 524 and/or mud excluder portion 522 of the body 520, and a second plurality of stabilizer pads is positioned on the body 520 in an uphole axial direction relative to the windows 524 and/or mud excluder portion 522 of the body 520.

In some embodiments, the body 520 of the LWD tool 512 includes a protective coating on the body 520 proximate to the windows 524 and/or on the surface of the detector region 536. In some embodiments, the protective coating is a tungsten carbide coating. For example, the body 520 may be or include steel with a tungsten coating on an outer surface thereof.

In some embodiments, the plurality of stabilizer pads 538 and/or at least the first stabilizer pad 540 includes an ultrahard material. In some examples, the plurality of stabilizer pads 538 and/or at least the first stabilizer pad 540 may include a diamond material, such as thermally stable polycrystalline diamond (TSPD) inserts 542. In some examples, the plurality of stabilizer pads 538 and/or at least the first stabilizer pad 540 may include a non-diamond ultrahard material, such as tungsten carbide inserts (TCI) brazed or otherwise affixed to the stabilizer pad. In some embodiments, the plurality of stabilizer pads 538 and/or at least the first stabilizer pad 540 may include a combination of diamond and non-diamond inserts or hardfacing, such as a TSPD insert 542 at a downhole end of the stabilizer pad (where the pad initially contacts the formation) and TPIs uphole of the TSPD insert 542.

In some embodiments, at least one stabilizer pad of the plurality of stabilizer pads is rotationally aligned with the mud excluder portion 522 and/or the windows 524 of the LWD tool 512. For example, at least a portion of a stabilizer pad may be axially aligned with the window 524 such that the window 524 is directly uphole from the stabilizer pad in the axial direction. In at least one example, the end of the first stabilizer pad 540 that is proximate to the window(s) 524 and/or detector region 536 is axially aligned with the window(s) 524 and/or mud excluder 522. In such an example, the first stabilizer pad 540 may direct flow of drilling fluid (and debris therein) through a slot 541 between the pads and around the mud excluder 522 and/or window(s) 524 to limit wear thereto.

In some embodiments, the stabilizer pads 540, 543 (and slots 541 therebetween) of the plurality of stabilizer pads 538 are each oriented at an angle to the axial direction of the rotational axis 518. For example, the plurality of stabilizer pads 538 may helix around the body 520 of the LWD tool 512. In some embodiments, the angular displacement between the uphole end of the angled stabilizer pad and the downhole end allows each stabilizer pad to cover an angular sector of the LWD tool 512. For example, the downhole end of a first stabilizer pad 540 may angularly overlap the uphole end of an adjacent second stabilizer pad 543, such that the plurality of stabilizer pads 538 form a substantially continuous circumferential stabilizer surface during rotation.

In some embodiments, at least one stabilizer pad has an axial length that is greater than another stabilizer pad. For example, the first stabilizer pad 540 is position downhole of the detector region 536 and aligned with the mud excluder 522 and window(s) 524, while a second stabilizer pad 543 continues farther uphole in the axial direction than the first stabilizer pad 540, and the second stabilizer pad 543 axially overlaps at least a portion of the detector region 536. In some embodiments, at least one of the stabilizer pads of the plurality of stabilizer pads at least partially axially overlaps the detector region 536. In some embodiments, at least one of the stabilizer pads of the plurality of stabilizer pads axially overlaps the detector region 536 by at least 50% of the axial length of the detector region 536. In some embodiments, at least one of the stabilizer pads of the plurality of stabilizer pads axially overlaps the detector region 536 by at least 75% of the axial length of the detector region 536. In some embodiments, at least one of the stabilizer pads of the plurality of stabilizer pads completely axially overlaps the detector region 536.

In some embodiments, at least one stabilizer pad (or portion thereof) of the plurality of stabilizer pads 538 is selectively coupled to the body 520 of the LWD tool 512. For example, stabilizer pads may be replaceable on the body 520 to facilitate repairs, maintenance, or changes to a pad outer diameter defined by the plurality of stabilizer pads 538, such as described in relation to FIG. 6. In some embodiments, at least a portion of a stabilizer pad is coupled to the body 520 by one or more mechanical fasteners 544, such as bolts, screws, other threaded fasteners, clips, clamps, pins, rods, rivets, etc. In some embodiments, at least a portion of the stabilizer pad is coupled to the body 520 by a mechanical interlock, such as a sliding dovetail, a wedge, a pocket, etc.

Figure 6:
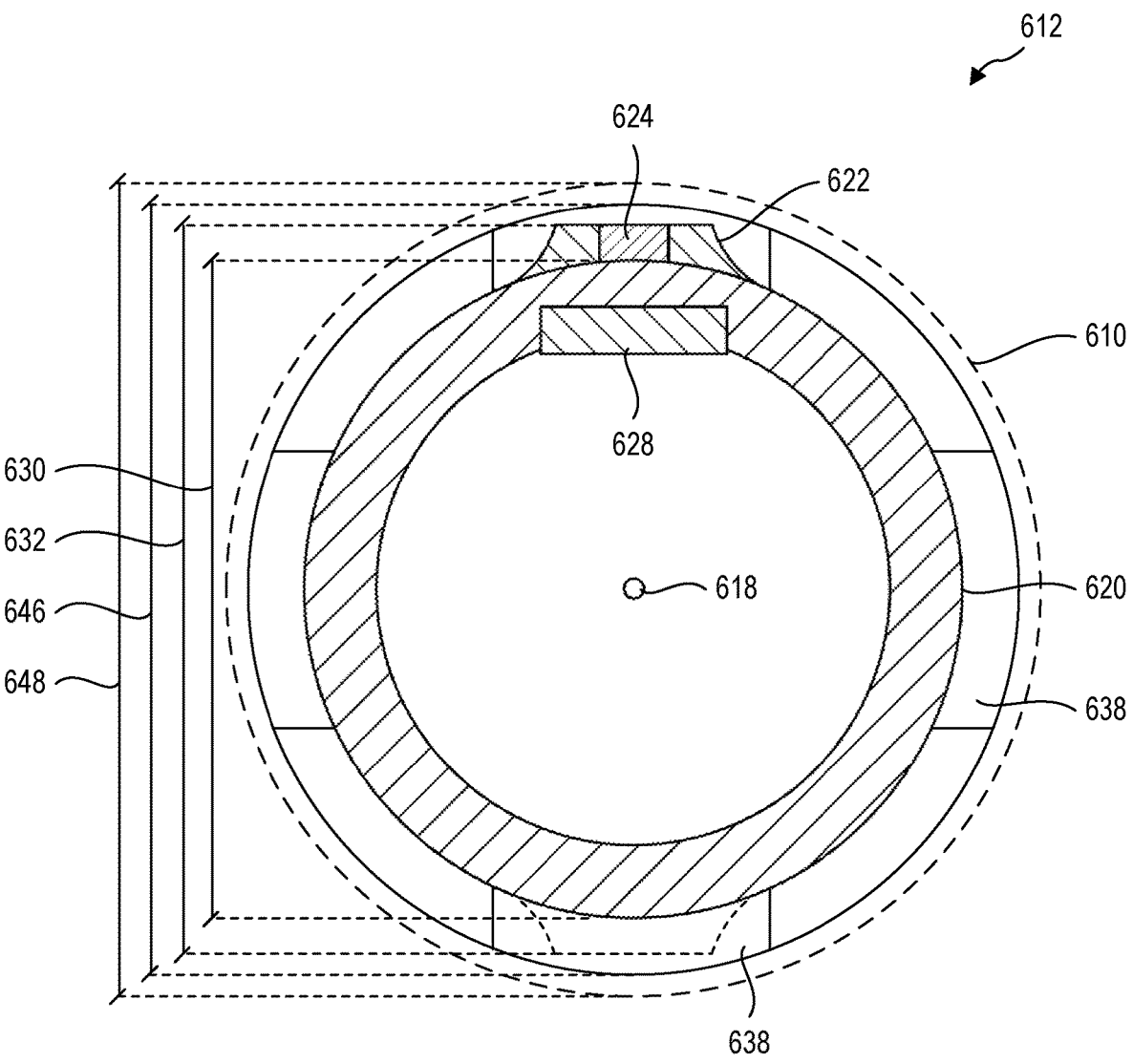
FIG. 6 is a transverse cross-sectional view of an LWD tool relative to a drill bit to which the LWD tool is connected, according to at least some embodiments of the present disclosure.

FIG. 6 is a transverse cross-sectional view of an embodiment of an LWD tool 612 relative to a drill bit 610 to which the LWD tool 612 is connected. In some embodiments, the LWD tool 612 has a body outer diameter 630 that is relative to the rotational axis 618 of the LWD tool 612. In some embodiments, the rotational axis 618 of the LWD tool 612 is the rotational axis 618 of the drill bit 610, and the outer diameters of each are therefore coaxially aligned.

The body outer diameter 630 is less than a window outer diameter 632 that is defined by the radial position of the window 624 and/or mud excluder portion 622 of the body 620 as the LWD tool 612 rotates about the rotational axis 618. As described herein, in some embodiments, the window outer diameter 632 is less than the bit diameter 648 of the drill bit 610. As the bit diameter 648 is substantially responsible for defining the borehole diameter, the difference between the window outer diameter 632 and the bit diameter 648 defines the distance between the window 624 and the formation in a conventional system. In an LWD tool 612 according to some embodiments of the present disclosure, the standoff between the window 624 and the formation is reduced by the plurality of stabilizer pads 638 supporting the LWD tool 612 in the borehole and limiting the lateral movement of the LWD tool 612. For example, an LWD tool with a window outer diameter 632 that is 0.25" less than the bit diameter 648 may have a maximum standoff of the window 624 of 0.25". The same embodiment of an LWD tool 612 with a plurality of stabilizer pads defining a pad outer diameter 646 that is 0.125" less than the bit diameter 648 results in a maximum standoff of the window 624 of 0.188".

In some embodiments, the window outer diameter 632 is ¼" less than bit diameter 648. In some embodiments, the window outer diameter 632 is ½" less than bit diameter 648. In some embodiments, the window outer diameter 632 is ⅛" less than bit diameter 648. In some embodiments, the pad outer diameter 646 is ⅛" less than bit diameter 648. In some embodiments, the pad outer diameter 646 is ¼" less than bit diameter 648. In some embodiments, the pad outer diameter 646 is ¹⁄₁₆" less than bit diameter 648. In some embodiments, the pad outer diameter 646 is no more than 5% greater than the window outer diameter 632. In some embodiments, the pad outer diameter 646 is no more than ⅛" greater than the window outer diameter 632.

Figure 7:
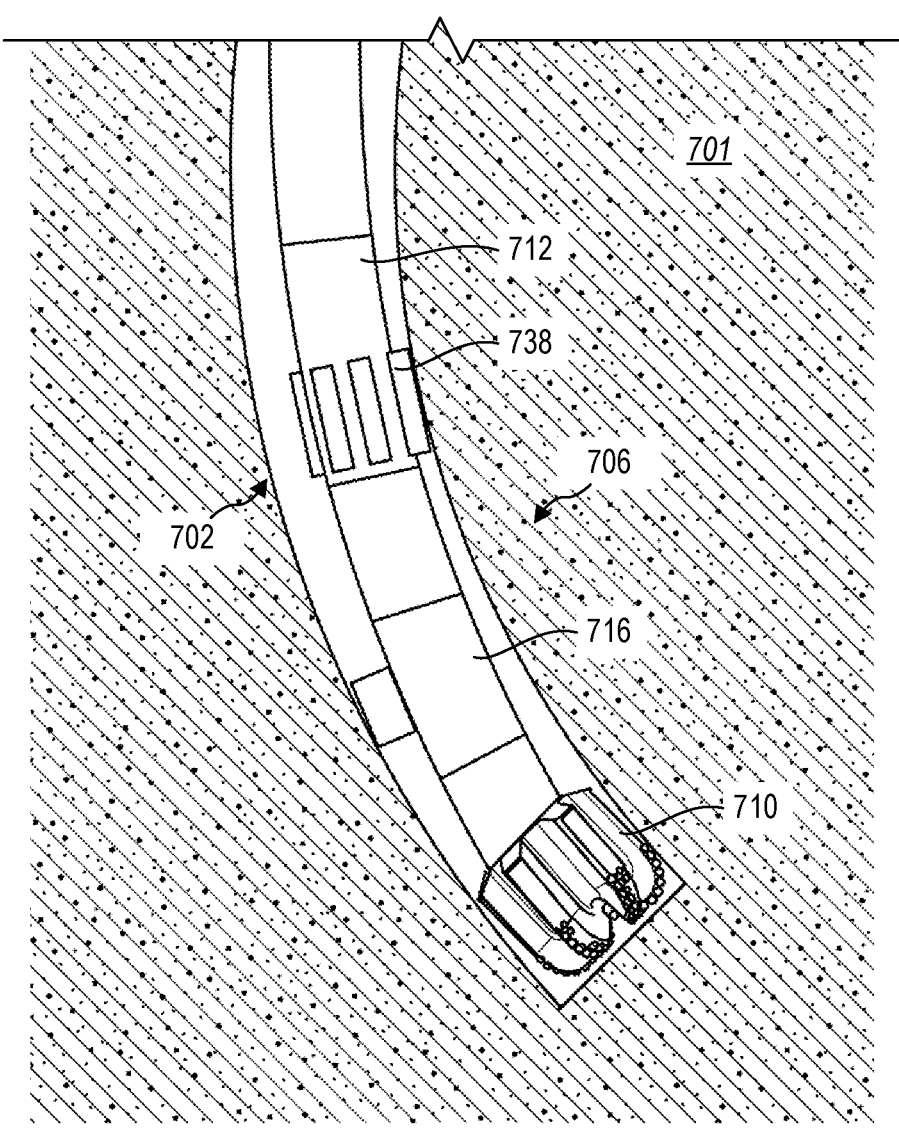
FIG. 7 is a schematic diagram of a BHA in a borehole, according to at least some embodiments of the present disclosure.

In some embodiments, the LWD tool is uphole from an RSS in the BHA, as described in relation to FIG. 2. In such examples, the LWD tool can be forced into contact with the formation wall during steering of the BHA. Referring now to FIG. 7, the BHA 706, in some embodiments, includes at least a drill bit 710, an RSS 716 uphole of the drill bit 710, and an LWD tool 712 uphole of the RSS 716. When the RSS 716 deploys a steering pad to contact the formation 701 in the borehole 702, the RSS 716 moves the BHA 706 laterally, which may cause the LWD tool 712 to contact the formation 701. In such examples, the plurality of stabilizer pads 738 of the LWD tool 712 contact the formation 701 instead of the window(s) of the LWD tool 712.

INDUSTRIAL APPLICABILITY

Embodiments of the present disclosure generally relate to devices, systems, and methods for drilling a borehole. More particularly, embodiments of the present disclosure relate to systems and methods for measuring downhole properties during drilling operations. For example, the bottomhole assembly (BHA) and/or drill string in the downhole environment may include one or more detectors or sensors configured to measure one or more properties of the surrounding formation through which the drill bit and drill string form the borehole.

In some embodiments, a drill string includes one or more measurement devices configured to collect signals or make measurements of downhole properties in a downhole environment. In some embodiments, the measurement devices collect information regarding the drill string, itself. In some embodiments, the measurement device collects information regarding the surrounding formation. The measurements of the surrounding formation may measure one or more properties of the solid material in the formation, such as rock, sediment, or organic material. The measurements of the surrounding formation may measure the formation fluid(s) in the formation. The measurements may include exposing the surrounding formation to an energy source, such as a radiation source, and measuring a response from the surrounding formation.

In at least one example, the measurement tool includes a gamma-radiation source that irradiates a portion of the surrounding formation. The gamma-radiation energizes material in the portion of the surrounding formation, which subsequently emits a signal. The measurement tool includes a detector that receives the signal and interprets the signal to determine a composition of at least part of the surrounding formation. In some embodiments, noise produced by drilling mud, swarf, cuttings, the tool body, and other material between the source and the formation and between the formation and the detector can interfere with measurements. Polymer or other radio-transparent windows can improve signal to noise ratio but may experience accelerated wear.

In some embodiments, the BHA includes a drill bit configured to remove and/or degrade material from the formation to remove the material uphole through the borehole. The BHA, in some embodiments, includes one or more additional downhole tools based on the drilling plan. For example, a BHA may include an LWD tool connected to one or more components of the BHA and located uphole of the drill bit. In some examples, the BHA may include an MWD tool connected to one or more components of the BHA and located uphole of the drill bit. The BHA may include a rotary steerable system (RSS) connected to one or more components of the BHA and located uphole of the drill bit. In some embodiments, additional components or tools are present in the BHA, and the BHA may extend tens of feet or meters uphole from the drill bit.

As described herein, the LWD tool is positioned in an uphole direction from the drill bit and, in some embodiments, in a BHA with an RSS. In such examples, the LWD tool is exposed to drilling mud flowing in the annular space around the LWD tool and BHA, which includes swarf, cuttings, and other debris created by the drill bit. The drilling mud can damage a sensor or window of the LWD tool and/or interfere with measurements or signals collected by the sensors or detectors of the LWD tool. Furthermore, the RSS may be configured to apply a lateral force to the formation at the wall of the wellbore and urge the drill bit and BHA in the opposite direction. This can cause contact between a sensor or window of the LWD tool and the formation, damaging the sensor or window of the LWD tool. The varying distance from the sensor or window of the LWD tool to the formation (and the varying volume of drilling mud therebetween) can limit the precision and/or accuracy of formation measurements.

In some embodiments, the LWD tool includes a body having a rotational axis about which the LWD tool rotates during drilling operations. In some embodiments, the body is made or includes elements or compounds that can limit or prevent the emission of radiation from the radiation source and/or limit or prevent the receipt of radiation at a radiation detector. In some examples, the body is a steel or other iron-bearing alloy. In some examples, the iron can absorb and/or re-emit photons that interfere with the measurements of the formation.

The LWD tool, in some embodiments, includes a radio-transparent or radio-translucent window. For example, the window may be or include a polymer material. The windows allow the photons and/or radiation produced by the radiation source to exit the LWD tool more efficiently than exiting through the body of the LWD tool. The energizing radiation may subsequently energize and/or interact with the formation, and the window(s) allow the signal radiation from the formation to enter into the LWD tool for detection by the radiation detector(s). In some embodiments, the energizing radiation from the radiation source and/or the signal radiation is inhibited by a drilling fluid in the borehole between the LWD tool and the formation.

In some embodiments, the body of the LWD tool has a radially outward surface relative to the rotational axis that includes a mud excluder portion. The mud excluder portion is a region of the body that has a greater outer diameter relative to the rotational axis and includes the windows. The mud excluder portion displaces the drilling fluid within the annular space around the LWD tool at the windows, reducing the amount of drilling fluid between the radiation source and/or the radiation detector and the formation, which, in turn, reduces the interference caused by the drilling fluid.

In some embodiments, the mud excluder portion includes a window with a radiation detector positioned behind (e.g., radially inward from) the window. In some embodiments, the mud excluder portion containing the window(s) defines a window outer diameter that is greater than the body outer diameter. While the mud excluder portion, therefore, reduces the amount of drilling fluid between the window and the formation, the mud excluder portion can contact the formation. Contact between the formation and the mud excluder portion can damage the mud excluder portion and/or the window(s). Contact between the formation and the mud excluder portion during rotation of the LWD tool around the rotational axis can induce lateral movement of the LWD tool and/or connected downhole components. The lateral movement can produce variability in the distance between the detector and/or window relative to the formation, compromising measurement quality, and also introduce shock and/or vibration to the LWD tool and connected components.

In some embodiments, an LWD tool includes at least one stabilizer pad to protect the window(s) of the LWD tool. In some embodiments, the stabilizer pad is one of a plurality of stabilizer pads that are positioned on the outer surface of the body of the LWD tool. In some embodiments, the plurality of stabilizer pads define a pad outer diameter of the LWD tool that is greater than the window outer diameter of the window and/or mud excluder portion to provide a standoff from the formation in the borehole and protect the window.

In some embodiments, the plurality of stabilizer pads is positioned on the body in a downhole axial direction (of the rotational axis) relative to the windows and/or mud excluder portion of the body. In some embodiments, the windows and associated radiation detectors and/or radiation sources, such as described herein, are located in a detector region of the LWD tool. In some embodiments, the plurality of stabilizer pads is positioned on the body in a downhole axial direction relative to the detector region.

In some embodiments, the plurality of stabilizer pads is positioned on the body in an uphole axial direction of the windows and/or mud excluder portion of the body. In some embodiments, the plurality of stabilizer pads is positioned on the body in an uphole axial direction of the detector region.

In some embodiments, a first plurality of stabilizer pads is positioned on the body in a downhole axial direction relative to the detector region, and a second plurality of stabilizer pads is positioned on the body in an uphole axial direction relative to the detector region. In some embodiments, a first plurality of stabilizer pads is positioned on the body in a downhole axial direction of the windows and/or mud excluder portion of the body, and a second plurality of stabilizer pads is positioned on the body in an uphole axial direction relative to the windows and/or mud excluder portion of the body.

In some embodiments, the body of the LWD tool includes a protective coating on the body proximate to the windows and/or on the surface of the detector region. In some embodiments, the protective coating is a tungsten carbide coating. For example, the body may be or include steel with a tungsten coating on an outer surface thereof.

In some embodiments, the plurality of stabilizer pads and/or at least the first stabilizer pad 540 includes an ultrahard material. In some examples, the plurality of stabilizer pads and/or at least the first stabilizer pad may include a diamond material, such as thermally stable polycrystalline diamond (TSPD) inserts. In some examples, the plurality of stabilizer pads and/or at least the first stabilizer pad may include a non-diamond ultrahard material, such as tungsten carbide inserts (TCI) brazed or otherwise affixed to the stabilizer pad. In some embodiments, the plurality of stabilizer pads and/or at least the first stabilizer pad may include a combination of diamond and non-diamond inserts or hardfacing, such as a TSPD insert at a downhole end of the stabilizer pad (where the pad initially contacts the formation) and TPIs uphole of the TSPD insert.

In some embodiments, at least one stabilizer pad of the plurality of stabilizer pads is rotationally aligned with the mud excluder portion and/or the windows of the LWD tool. For example, at least a portion of a stabilizer pad may be axially aligned with the window such that the window is directly uphole from the stabilizer pad in the axial direction. In at least one example, the end of the first stabilizer pad that is proximate to the window(s) and/or detector region is axially aligned with the window(s) and/or mud excluder. In such an example, the first stabilizer pad may direct flow of drilling fluid (and debris therein) through a slot between the pads and around the mud excluder and/or window(s) to limit wear thereto.

In some embodiments, the stabilizer pads (and slots therebetween) of the plurality of stabilizer pads are each oriented at an angle to the axial direction of the rotational axis. For example, the plurality of stabilizer pads may helix around the body of the LWD tool. In some embodiments, the angular displacement between the uphole end of the angled stabilizer pad and the downhole end allows each stabilizer pad to cover an angular sector of the LWD tool. For example, the downhole end of a first stabilizer pad may angularly overlap the uphole end of an adjacent second stabilizer pad, such that the plurality of stabilizer pads form a substantially continuous circumferential stabilizer surface during rotation.

In some embodiments, at least one stabilizer pad has an axial length that is greater than another stabilizer pad. For example, the first stabilizer pad is position downhole of the detector portion and aligned with the mud excluder and window(s), while a second stabilizer pad continues farther uphole in the axial direction than the first stabilizer pad, and the second stabilizer pad axially overlaps at least a portion of the detector region. In some embodiments, at least one of the stabilizer pads of the plurality of stabilizer pads at least partially axially overlaps the detector region. In some embodiments, at least one of the stabilizer pads of the plurality of stabilizer pads axially overlaps the detector region by at least 50% of the axial length of the detector region. In some embodiments, at least one of the stabilizer pads of the plurality of stabilizer pads axially overlaps the detector region by at least 75% of the axial length of the detector region. In some embodiments, at least one of the stabilizer pads of the plurality of stabilizer pads completely axially overlaps the detector region.

In some embodiments, at least one stabilizer pad (or portion thereof) of the plurality of stabilizer pads is selectively coupled to the body of the LWD tool. For example, stabilizer pads may be replaceable on the body to facilitate repairs, maintenance, or changes to a pad outer diameter defined by the plurality of stabilizer pads, such as described herein. In some embodiments, at least a portion of a stabilizer pad is coupled to the body by one or more mechanical fasteners, such as bolts, screws, other threaded fasteners, clips, clamps, pins, rods, rivets, etc. In some embodiments, at least a portion of the stabilizer pad is coupled to the body by a mechanical interlock, such as a sliding dovetail, a wedge, a pocket, etc.

In some embodiments, the LWD tool has a body outer diameter that is relative to the rotational axis of the LWD tool. In some embodiments, the rotational axis of the LWD tool is the rotational axis of the drill bit, and the outer diameters of each are therefore coaxially aligned.

The body outer diameter is less than a window outer diameter that is defined by the radial position of the window and/or mud excluder portion of the body as the LWD tool rotates about the rotational axis. As described herein, in some embodiments, the window outer diameter is less than the bit diameter of the drill bit. As the bit diameter is substantially responsible for defining the borehole diameter, the difference between the window outer diameter and the bit diameter defines the distance between the window and the formation in a conventional system. In an LWD tool according to some embodiments of the present disclosure, the standoff between the window and the formation is reduced by the plurality of stabilizer pads supporting the LWD tool in the borehole and limiting the lateral movement of the LWD tool. For example, an LWD tool with a window outer diameter that is 0.25" less than the bit diameter may have a maximum standoff of the window of 0.25". The same embodiment of an LWD tool with a plurality of stabilizer pads defining a pad outer diameter that is 0.125" less than the bit diameter results in a maximum standoff of the window of 0.188".

In some embodiments, the window outer diameter is ¼" less than bit diameter. In some embodiments, the window outer diameter is ½" less than bit diameter. In some embodiments, the window outer diameter is ⅛" less than bit diameter. In some embodiments, the pad outer diameter is ⅛" less than bit diameter. In some embodiments, the pad outer diameter is ¼" less than bit diameter. In some embodiments, the pad outer diameter is ¹⁄₁₆" less than bit diameter. In some embodiments, the pad outer diameter is no more than 5% greater than the window outer diameter. In some embodiments, the pad outer diameter is no more than ⅛" greater than the window outer diameter.

The present disclosure relates to systems and methods for measuring downhole properties in a borehole according to any of the following:

Clause 1. A downhole tool comprising: a body having a rotational axis oriented in an axial direction; a sensor positioned proximate to a window in a radially outward surface of the body, wherein the window defines a window outer diameter relative to the rotational axis; and a plurality of stabilizer pads positioned on the outward surface of the body in a downhole direction of the axial direction relative to the window, wherein the plurality of stabilizer pads defines a pad outer diameter relative to the rotational axis that is greater than the window outer diameter.

Clause 2. The downhole tool of clause 1, wherein the radially outward surface of the body includes a mud excluder portion and a base portion, wherein: the mud excluder portion has an outer diameter that is the window outer diameter, and the base portion has a base outer diameter that is less than the window outer diameter.

Clause 3. The downhole tool of clause 2, wherein the mud excluder portion of the outward surface of the body includes tungsten carbide.

Clause 4. The downhole tool of any preceding clause, wherein the pad outer diameter is no more than ⅛" greater than the window outer diameter.

Clause 5. The downhole tool of any preceding clause, wherein the pad outer diameter is no more than 5% greater than the window outer diameter.

Clause 6. The downhole tool of any preceding clause, wherein the sensor is a radiation detector.

Clause 7. The downhole tool of any preceding clause, further comprising a radiation source in the body.

Clause 8. The downhole tool of any preceding clause, wherein a stabilizer pad of the plurality of stabilizer pads includes at least one of a thermally stable polycrystalline diamond (TSPD) insert and tungsten carbide insert (TCI).

Clause 9. The downhole tool of any preceding clause, wherein a stabilizer pad of the plurality of stabilizer pads includes is selectively coupled to the body with one or more mechanical fasteners.

Clause 10. The downhole tool of any preceding clause, wherein the plurality of stabilizer pads include at least a first stabilizer pad having an uphole end of the first stabilizer pad that is aligned with the window.

Clause 11. The downhole tool of clause 10, wherein the first stabilizer pad is oriented at an angle relative to the axial direction.

Clause 12. The downhole tool of clause 11, wherein the plurality of stabilizer pads define a substantially continuous circumferential stabilizer surface.

Clause 13. A system for drilling a borehole, the system comprising: a drill bit having a rotational axis and a bit diameter relative to the rotational axis; and a logging-while-drilling (LWD) tool connected to the drill bit, the LWD tool including: a body having a rotational axis oriented in an axial direction, a sensor positioned proximate to a window in a radially outward surface of the body, wherein the window defines a window outer diameter relative to the rotational axis, and a plurality of stabilizer pads positioned on the outward surface of the body in a downhole direction of the axial direction relative to the window, wherein the plurality of stabilizer pads defines a pad outer diameter relative to the rotational axis that is less than the bit diameter and greater than the window outer diameter.

Clause 14. The system of clause 13, wherein the pad outer diameter is no more than ⅛" less than bit diameter.

Clause 15. The system of clause 14, wherein the pad outer diameter is no more than ⅛" greater than the window outer diameter.

Clause 16. The system of any of clauses 13 through 15, wherein the plurality of stabilizer pads is a first plurality of stabilizer pads, and the system further comprises a second plurality of stabilizer pads positioned uphole from the first plurality of stabilizer pads.

Clause 17. The system of clause 16, wherein the second plurality of stabilizer pads are located on the outward surface of the body in an uphole direction of the axial direction relative to the window.

Clause 18. A system for drilling a borehole, the system comprising: a drill bit having a rotational axis and a drill bit diameter relative to the rotational axis; a rotary steerable system (RSS) connected to the drill bit, and a logging-while-drilling (LWD) tool connected to the drill bit, the LWD tool including: a body having a rotational axis oriented in an axial direction; a sensor positioned proximate to a window in a radially outward surface of the body, wherein the window defines a window outer diameter relative to the rotational axis; and a plurality of stabilizer pads positioned on the outward surface of the body, wherein the plurality of stabilizer pads defines a pad outer diameter relative to the rotational axis that is greater than the window outer diameter.

Clause 19. The system of clause 18, wherein the plurality of stabilizer pads define a substantially continuous circumferential stabilizer surface, and the RSS is configured to apply a radially outward force axially between the drill bit and the circumferential stabilizer surface.

Clause 20. The system of clause 18, wherein the plurality of stabilizer pads are located in a downhole direction relative to the window.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A logging-while-drilling (LWD) tool configured to connect to a drill bit, the LWD tool comprising:
   a body having a rotational axis oriented in an axial direction;
   a sensor positioned proximate to a window in a radially outward surface of the body, wherein the window defines a window outer diameter relative to the rotational axis;
   a first plurality of stabilizer pads positioned on the outward surface of the body in a downhole direction of the axial direction relative to the window, wherein the first plurality of stabilizer pads defines a pad outer diameter relative to the rotational axis that is less than a bit diameter of the drill bit and greater than the window outer diameter; and
   a second plurality of stabilizer pads positioned uphole from the first plurality of stabilizer pads.

2. The LWD tool of claim 1, wherein the radially outward surface of the body includes a mud excluder portion and a base portion, wherein:
   the mud excluder portion has an outer diameter that is the window outer diameter; and
   the base portion has a base outer diameter that is less than the window outer diameter.

3. The LWD tool of claim 2, wherein the mud excluder portion of the outward surface of the body includes tungsten carbide.

4. The LWD tool of claim 1, wherein the pad outer diameter is no more than ⅛" greater than the window outer diameter.

5. The LWD tool of claim 1, wherein the pad outer diameter is no more than 5% greater than the window outer diameter.

6. The LWD tool of claim 1, wherein the sensor is a radiation detector.

7. The LWD tool of claim 1, further comprising a radiation source in the body.

8. The LWD tool of claim 1, wherein a stabilizer pad of the first plurality of stabilizer pads includes at least one of a thermally stable polycrystalline diamond (TSPD) insert and tungsten carbide insert (TCI).

9. The LWD tool of claim 1, wherein a stabilizer pad of the first plurality of stabilizer pads includes is selectively coupled to the body with one or more mechanical fasteners.

10. The LWD tool of claim 1, wherein the first plurality of stabilizer pads includes at least a first stabilizer pad having an uphole end of the first stabilizer pad that is aligned with the window.

11. The LWD tool of claim 10, wherein the first stabilizer pad is oriented at an angle relative to the axial direction.

12. The LWD tool of claim 11, wherein the first plurality of stabilizer pads defines a substantially continuous circumferential stabilizer surface.

13. A system for drilling a borehole, the system comprising:
   a drill bit having a rotational axis and a bit diameter relative to the rotational axis; and
   a logging-while-drilling (LWD) tool connected to the drill bit, the LWD tool including:
      a body having a rotational axis oriented in an axial direction;
      a sensor positioned proximate to a window in a radially outward surface of the body, wherein the window defines a window outer diameter relative to the rotational axis;
      a first plurality of stabilizer pads positioned on the outward surface of the body in a downhole direction of the axial direction relative to the window, wherein the first plurality of stabilizer pads defines a pad outer diameter relative to the rotational axis that is less than the bit diameter and greater than the window outer diameter; and
      a second plurality of stabilizer pads positioned uphole from the first plurality of stabilizer pads.

14. The system of claim 13, wherein the pad outer diameter is no more than ⅛" less than the bit diameter.

15. The system of claim 14, wherein the pad outer diameter is no more than ⅛" greater than the window outer diameter.

16. The system of claim 13, wherein the second plurality of stabilizer pads is located on the outward surface of the body in an uphole direction of the axial direction relative to the window.

17. A system for drilling a borehole, the system comprising:
   a drill bit having a rotational axis and a drill bit diameter relative to the rotational axis;
   a rotary steerable system (RSS) connected to the drill bit, and
   a logging-while-drilling (LWD) tool connected to the drill bit, the LWD tool including:
      a body having a rotational axis oriented in an axial direction;
      a sensor positioned proximate to a window in a radially outward surface of the body, wherein the window defines a window outer diameter relative to the rotational axis;
      a first plurality of stabilizer pads positioned on the outward surface of the body in a downhole direction of the axial direction relative to the window, wherein the first plurality of stabilizer pads defines a pad outer diameter relative to the rotational axis that is less than the drill bit diameter and greater than the window outer diameter; and
      a second plurality of stabilizer pads positioned uphole from the first plurality of stabilizer pads.

18. The system of claim 17, wherein the first plurality of stabilizer pads defines a substantially continuous circumferential stabilizer surface, and the RSS is configured to apply a radially outward force axially between the drill bit and the circumferential stabilizer surface.

* * * * *